US008767112B2

(12) United States Patent
Cheruel

(10) Patent No.: US 8,767,112 B2
(45) Date of Patent: Jul. 1, 2014

(54) LUMINANCE CONTROL OF A DISPLAY DEVICE

(75) Inventor: Fabrice Cheruel, Mulsanne (FR)

(73) Assignee: ST-Ericsson SA, Plan-les-Ouates (CH)

( * ) Notice: Subject to any disclaimer, the term of this patent is extended or adjusted under 35 U.S.C. 154(b) by 18 days.

(21) Appl. No.: 13/516,727

(22) PCT Filed: Dec. 15, 2010

(86) PCT No.: PCT/EP2010/069727
§ 371 (c)(1), (2), (4) Date: Jun. 16, 2012

(87) PCT Pub. No.: WO2011/073243
PCT Pub. Date: Jun. 23, 2011

(65) Prior Publication Data

US 2012/0257080 A1 Oct. 11, 2012

(30) Foreign Application Priority Data

Dec. 18, 2009 (FR) .................................... 09 59257

(51) Int. Cl.
*H04N 5/222* (2006.01)

(52) U.S. Cl.
USPC .................................................... 348/333.01

(58) Field of Classification Search
USPC .................... 348/222.1, 255, 333.01, 333.05, 348/333.12, 333.13, 362
See application file for complete search history.

(56) References Cited

U.S. PATENT DOCUMENTS

| | | | | |
|---|---|---|---|---|
| 2005/0041139 | A1* | 2/2005 | Lowles | 348/362 |
| 2006/0274161 | A1* | 12/2006 | Ing et al. | 348/229.1 |
| 2008/0122821 | A1 | 5/2008 | Nilsson et al. | |
| 2008/0180464 | A1 | 7/2008 | Kang | |
| 2009/0147094 | A1* | 6/2009 | Chiang | 348/222.1 |
| 2012/0092541 | A1* | 4/2012 | Tuulos et al. | 348/333.01 |

FOREIGN PATENT DOCUMENTS

| | | | |
|---|---|---|---|
| GB | 2439120 | A | 12/2007 |
| WO | 0139167 | A1 | 5/2001 |
| WO | 2009101487 | A1 | 8/2009 |

* cited by examiner

*Primary Examiner* — Timothy J Henn
(74) *Attorney, Agent, or Firm* — Howison & Arnott, L.L.P.

(57) ABSTRACT

A device is proposed comprising a display screen for displaying digital information and/or images in a first mode of operation of the device, an image sensor having a set of photosensitive cells for capturing at least one digital image in a second mode of operation, and a control unit for controlling at least one display parameter of the screen in the first mode of operation. The control unit is configured to adjust the parameter on the basis of information representative of the brightness of ambient light obtained from at least a subset of the set of photosensitive cells of the image sensor.

18 Claims, 3 Drawing Sheets

LUMINANCE CONTROL OF A DISPLAY DEVICE

CROSS-REFERENCE TO RELATED APPLICATIONS

This application is a U.S. National Phase application submitted under 35 U.S.C. §371 of Patent Cooperation Treaty application Ser. No. PCT/EP2010/069727, filed Dec. 15, 2010, and entitled LUMINANCE CONTROL OF A DISPLAY DEVICE, which application claims priority to French patent application Ser. No. 0959257, filed Dec. 18, 2009, and entitled LUMINANCE CONTROL OF A DISPLAY DEVICE.

Patent Cooperation Treaty application Ser. No. PCT/EP2010/069727, published as WO 2011/073243, and French patent application Ser. No. 0959257, are incorporated herein by reference.

TECHNICAL FIELD

The invention relates to luminance control of a display of a portable electronics device that also has a digital device for capturing digital photos or videos.

It has particular applications in mobile telephones or comparable portable electronic devices.

BACKGROUND

Many mobile telephones contain an image sensor that has a set of optoelectronic elements, generally of the CCD ("Charge-Coupled Device") type, for capturing and digitizing images, and a display which is generally of the LCD ("Liquid Crystal Display") type for displaying digital images and/or other digital information. In the following description, "image capture and display device" means a device comprising such a sensor and such a display.

This image capture and display device conventionally cooperates with a light sensor placed near the display, which measures the brightness of the ambient light around the display. A control unit is configured to increase the power supplied to a backlighting device of the display when the brightness measured by the light sensor is less than one or more given thresholds.

SUMMARY

There is a need to reduce the cost, size, and weight of such portable electronic devices.

For this purpose, a first aspect of the invention proposes a device comprising:

a display screen for displaying digital information and/or images in a first mode of operation of the device;

an image sensor that has a set of photosensitive cells for capturing at least one digital image in a second mode of operation of the device; and a control unit to control at least one display parameter of the screen in the first mode of operation of the device.

The control unit is configured to adjust the display parameter of the screen based on information obtained from at least a subset of the set of photosensitive cells of the image sensor.

Advantageously, this image capture and display device does not require a dedicated light sensor for adjusting the screen backlighting, unlike prior art devices. It therefore satisfies the objective of reducing the cost, size, and weight of portable electronic devices that incorporate it.

In certain embodiments, the image capture and display device has one or more of the following characteristics:

the display parameter comprises at least one of the following: the contrast, luminance, and backlight intensity of the screen;

the device additionally comprises a power source configured to power all the photosensitive cells of the image sensor in the second (image capturing) mode of operation, and only the subset of photosensitive cells of the image sensor in the first mode of operation. This achieves significant battery power savings;

the subset of photosensitive cells of the image sensor comprises from a few photosensitive cells to several dozen photosensitive cells; such a number is a compromise between power consumption and the expected level of performance and robustness;

the image sensor comprises a processing unit configured to process digital image data in the second mode of operation before sending it to the control unit via a parallel data interface, and to generate information representative of the brightness of the ambient light in the first mode of operation before sending it to the control unit via a serial data interface. This arrangement also limits the power consumption;

the image sensor comprises a buffer for storing digital image data in the second mode of operation, and power to said buffer is cut off in the first mode of operation. Again, this arrangement limits the power consumption; and, the control unit is configured to make adjustments to the display parameter in the first mode of operation, on the basis of information representative of the brightness of the ambient light, in a periodic manner and looping as long as a stop condition is not satisfied. The interval of time between two adjustments to the display parameter results from a compromise between the expected level of performance and the power consumption.

In a second aspect, the invention proposes a process for controlling at least one display parameter of a device comprising a screen for displaying digital information and/or images in a first mode of operation of the device and an image sensor having a set of photosensitive cells for capturing at least one digital image in a second mode of operation of the device. Advantageously, the display parameter is adjusted on the basis of information representative of the brightness of ambient light obtained from at least a subset of the set of photosensitive cells of the image sensor.

Another object of the invention is a portable electronic device comprising an image capture and display device according to the first aspect above.

Lastly, a further object of the invention is a computer program comprising instructions for executing all the steps of a process according to the second aspect described above, when the program is executed by a processor.

BRIEF DESCRIPTION OF THE DRAWINGS

The invention will be better understood from the following description, given by way of example only and with reference to the drawings, in which.

DETAILED DESCRIPTION

Figure 1:
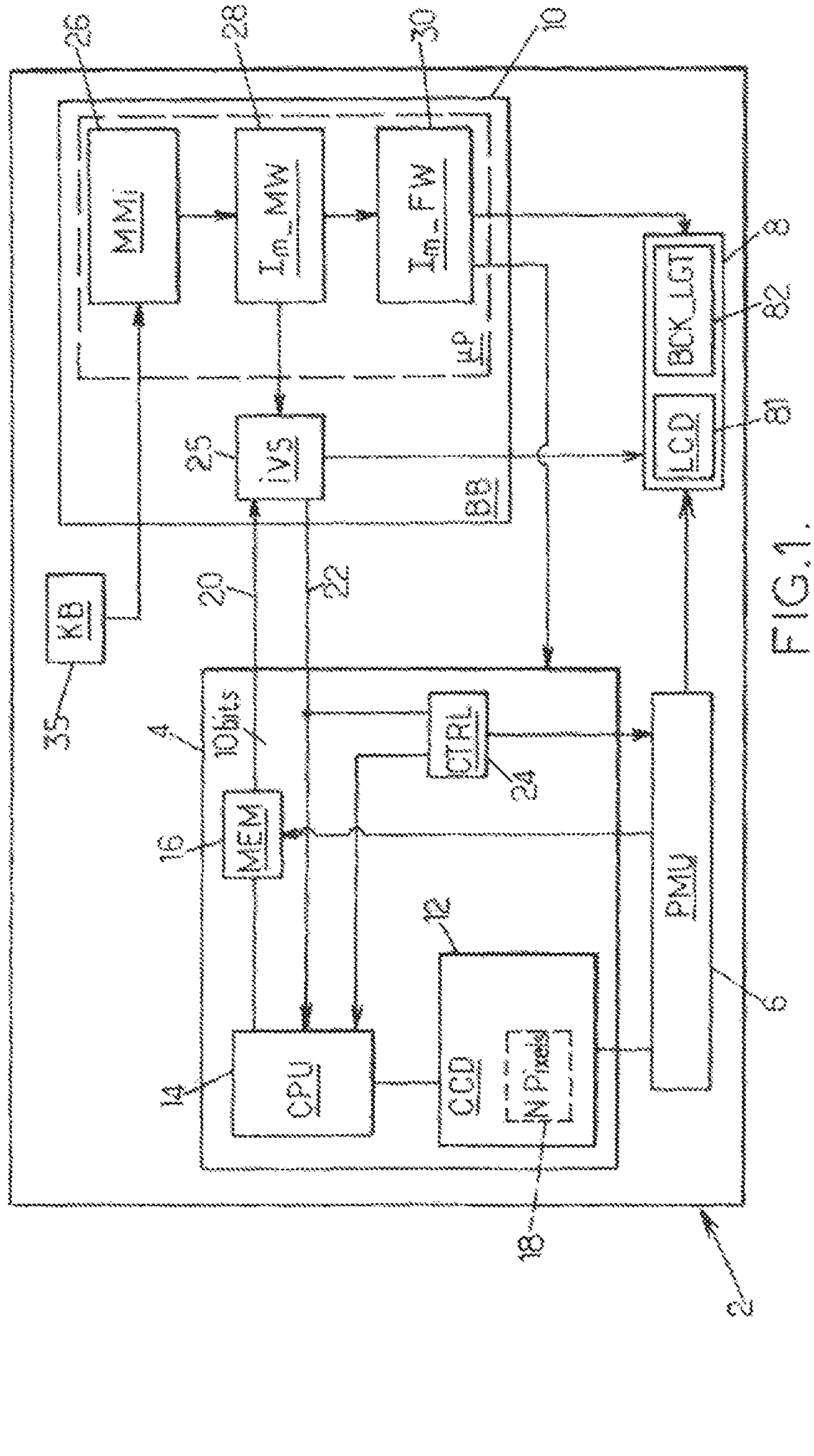
FIG. 1 is a diagram representing an image capture and display device according to one embodiment.

With reference to FIG. 1, the image capture and display device 2 comprises an image capture unit 4, a power management unit 6, a display screen 8, a control unit 10 based for example on the baseband (BB) microprocessor, and an activation member 35.

The capture unit 4 is based on an image sensor, for example a CCD sensor, adapted to capture an image in digital format, or several such digital images forming a digital video. The digital image information is encoded in a given image encoding format such as RGB, Y/C, YUV, etc.

The unit 6 is adapted to allow or prevent power to certain elements of the capture unit 4, and of the screen 8, in order to save battery charge in the battery that powers the device.

The screen 8 comprises for example an LCD screen 81 adapted to display the digital images captured by the capture unit 4 and/or other digital information such as commands, menus, icons, data, etc. Said screen is associated with a backlighting device 82.

The control unit 10 comprises memory as well as hardware and software for processing data, which will be described in more detail below.

Lastly, the activation member can be a push button or similar button, a key of a keyboard, a pad serving as a virtual keyboard, a scroll wheel and/or keys for moving up or down, left or right, etc.

The display device 2 can operate in a first mode of operation, called “image capture mode”, in which it is able to capture a photograph or video via the image sensor or capture unit 4. It can also operate in a second mode of operation, called “display mode”, in which the screen 8 is commanded to display data visible to the user, for example for reading or writing text messages, playing a game, viewing photos or videos, etc.

The image sensor or capture unit 4 comprises a matrix of photosensitive cells 12 adapted to capture digital image data, a digital processing unit 14 configured to process the digital data obtained from the photosensitive cell matrix 12, and a buffer 16 adapted to store temporarily the digital image data processed by the processing unit 14.

The matrix of photosensitive cells 12 in combination with the processing unit 14 has the function of capturing light rays, converting them into electrical signals representative of luminance and/or chrominance values (depending on the type of image encoding), and then digitizing them. A pixel corresponds to the basic digital image information captured by a given photosensitive cell. An image capture cycle corresponds to the time required to perform the above operations for all cells in the photosensitive matrix 12, which gives all the information or pixels of a digital image. This information is temporarily stored in the buffer 16, in each cycle.

In practice, the photosensitive matrix 12 is suitable for capturing a succession of digital images, meaning a video, at a given capture frequency.

Whereas in the image capture mode all photosensitive cells of the photosensitive matrix 12 capture a digital image, in the display mode only part of the photosensitive cells of the matrix, referred to in what follows as the sub-matrix 18, capture what can be called an image portion. The sub-matrix 18 thus comprises a number N of photosensitive cells, a number much lower than the total number of photosensitive cells of the photosensitive matrix 12.

In the image capture mode, the processing unit 14 processes the digital image data issuing from the photosensitive matrix 12 before sending them to the buffer 16. This processing can include, for example, color balance correction, bad pixel correction, noise filtering, histogram calculation, and/or exposure correction based on luminance measurements. Typically, the buffer 16 is of the SDRAM type, able to store about 3 million pixels per one-second cycle (3 million pixels per second).

In the display mode of operation, only the information from the digital image portion which is captured by the photosensitive cells of the sub-matrix 18 is sent to the processing unit 14. In this mode, the processing unit 14 is configured to determine from the values of the N pixels captured by the sub-matrix 18, which each encode associated luminance and/or chrominance information, only the values representative of the luminance, meaning the brightness of the ambient light. These latter values are sent to a luminance control unit of the screen 8 as will be described below. In a variation, only one value representative of the respective luminance values associated with the N pixels is sent, for example the average of these values. The advantage obtained is then two-fold. There is only one value to consider in the control unit 10, and the electrical consumption of the sensor is lower.

The number N of photosensitive cells of the sub-matrix 18 is chosen as a compromise between two conflicting considerations. It must be fairly low because one wants minimize as much as possible the electrical power consumed by the photosensitive cells of the sub-matrix 18 in display mode. However, the number of photoelectric cells of this sub-matrix 18 must be sufficient to obtain a reliable luminance value under all operating conditions and to take into account the possible malfunction of certain cells, which can manifest either from the start or during the life of the device due to damage or age.

The number N can be between about 2 and 100. Preferably the sub-matrix comprises a number N of cells that is between a few cells and several dozen cells. In one example, it comprises nine (9) photosensitive cells arranged in a 3×3 sub-matrix, which is more simple.

Alternatively or additionally, the N cells of the sub-matrix 18 can correspond to one (or several) rows of the photosensitive matrix 12. For an image sensor with 3 million pixels, a row comprises about 1500 photosensitive cells, therefore in this case N can reach several thousand photosensitive cells. This embodiment does not require modifying the sensor to allow powering and selecting the sub-matrix 18 only. It also minimizes the power consumption during display mode.

Alternatively, the N cells of the sub-matrix 18 can be distributed in different zones in the photosensitive matrix 12, in order to obtain a dispersive effect in the values they produce to represent the ambient light. The measurement of ambient light that results, on the average, is then more reliable because it is less dependent on a local value which could be specific to a particular area in the matrix without being representative of the general ambient light.

To summarize, the number N of photosensitive cells in the sub-matrix 18 is between a few cells and several thousand cells, but it is always much lower than the total number of cells in the photosensitive matrix 12. Typically, the expression “much lower” corresponds to a 1 to 1000 ratio, or even 1 to 10,000. Thus the electrical consumption due to powering the cells used in display mode is negligible compared to that in image capture mode.

The image capture unit 4 additionally comprises a parallel interface 20, typically high speed (for example an 8-bit interface), between the buffer 16 and the control unit 10, which is the baseband (BB) processor of a mobile telephone in this example. It also comprises a serial interface 22, in particular a low-speed interface, directly connecting the processing unit 14 to the processor 10 (via an interface module not represented). The capture unit 4 also comprises a control module 24 coupled to the serial interface 22, to the processing unit 14, and to the power management unit 6.

The function of the high speed interface 20 is to send to the processor 10 the digital image data acquired in the image capture mode. The transmission rate of this interface is typically between 3 and 10 Mbps.

The main function of the low speed serial interface 22 is to send to the capture unit 4 the commands generated by the control unit 10. Here, it is advantageous if it is also used to send to the processor 10 the value(s) representative of the ambient light, produced by the processing unit 14 of the unit 4 in display mode. This serial interface 22 has a transmission rate which is less than 400 kbps, and in particular less than 200 kbps. In practice, a value representative of the luminance is for example encoded in only 8 bits (1 byte) and can be sent only once a second. This is therefore largely compatible with the speed of the serial interface 22, even for a number of luminance values equal to N where N=100, which would be the maximum number of luminance values to be sent in the examples considered here.

The control module 24 receives, via the serial interface 22, signals to activate the display mode or the image capture mode, which are sent to it from the processor 10. It sends commands to the processing unit 14 and to the power management unit 6, so that these can adapt their operation to the mode of operation concerned.

Thus, notably, the power management unit 6 activates power to all the photosensitive cells of the photosensitive matrix 12 upon receipt by the module 24 of a signal to activate the image capture mode, or to only N photosensitive cells of the sub-matrix 18 upon receipt of a signal to activate the display mode.

The power management unit 6 disables power to the buffer 16 of the image sensor or capture unit 4 while enabling power to the screen 8, upon receipt by the unit 24 of a signal to activate display mode.

Conversely, it enables power to the buffer 16 of the image sensor 4 and disables power to the screen 8 upon receipt by the unit 24 of a signal to activate image capture mode.

This power management saves battery charge in the battery that powers the portable device.

The control unit 10, constituted for example by the baseband processor of the portable telephone as has already been mentioned, will now be described in more detail.

The control unit 10 comprises an Imaging and Video System 25 (IVS), a Man-Machine Interface module 26 (MMI), an Imaging Middleware module 28 ("Im_MW"), and an Imaging Framework module 30 ("Im_FM") for accessing the hardware components such as the screen 8.

The man-machine interface module 26 is configured to monitor the state of operation of the image capture and display device 2. For this purpose, it manages a timer of a duration T1 after activation by the user of the activation member 35 of the image capture and display device 2. This timer will be further described below. The activation member 35 is activated by the user when the user wants to capture a single image or a video, which requires placing the device in image capture mode.

The imaging middleware module 28 is configured to calculate adjustments to the brightness of the display screen 8, and in particular commands to control the power to the backlighting device of the screen and/or to control the brightness and contrast of digital images to be displayed, based on luminance values received from the processing unit 14 via the interface 22. These commands are sent to the screen 8 via the IVS system designated by the reference numeral 25.

In order to perform its function, the imaging middleware module 28 receives signals to activate the display mode or image capture mode, coming from the MI module 26, and the value(s) representative of the ambient light, coming from the image sensor or capture unit 4 via the IVS system designated by the reference numeral 25. It also manages another timer of a duration T2.

The function of the imaging framework module 30 is to control the turning on or off of the image sensor or capture unit 4 and the display screen 8. For this purpose, it is directly coupled to the sensor or capture unit 4 and to the screen 8.

The operation of the processor 10, and in particular each of its different software modules presented above, will now be described with reference to the block diagrams in FIG. 2 and FIG. 3.

Figure 2:
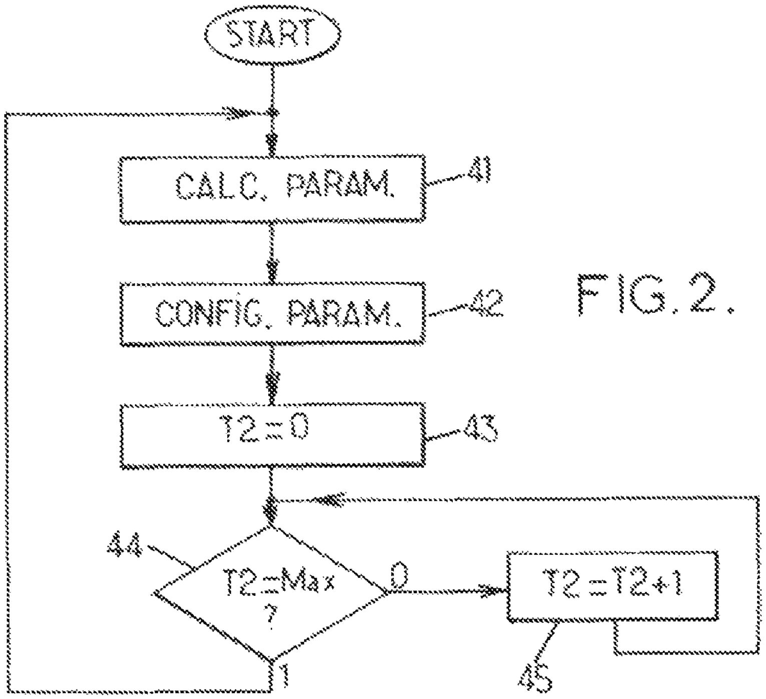
FIG. 2 is a block diagram illustrating the principle of a control loop for controlling the display parameter of the image capture and display device.
Figure 3:
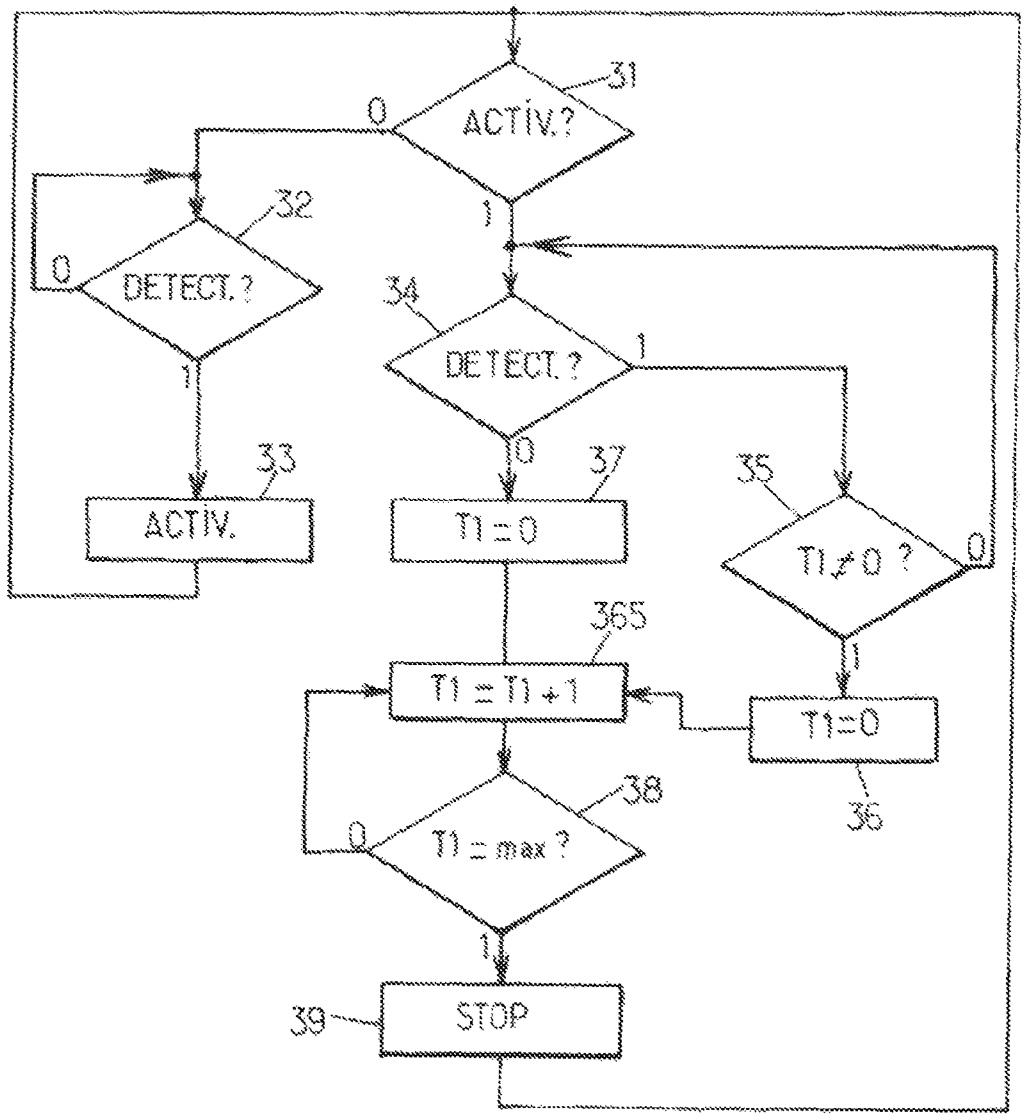
FIG. 3 is a block diagram illustrating the operating principle of the image capture and display device in display mode.

The diagram in FIG. 2 illustrates the steps in a loop that controls the display parameters of the display screen, which is executed in the display mode of the device. This mode is launched, for example, when the user starts up the device via the activation member 35 and/or any similar means in order to answer or initiate a call, read a text message, play a game (in Java™ or another format), navigate menus, etc. This activation can also be initiated by user contact with the screen 8 if it is a touch screen. It is controlled by the man-machine interface module 26 of the processor 10.

This MMI module 26 causes the imaging middleware module 28 to send a start display mode signal to the power management unit 6 and to the processing unit 14, via the low speed serial interface 22 and the control unit 24. Upon receipt of this signal, the power management unit 6 enables power to the screen 8 as well as to the sub-matrix 18, but not to the rest of the photosensitive matrix 12. The processor then executes the control loop described above. The steps of this control loop will now be described for one possible implementation.

During a step 41, the processing unit 14 calculates one (or more) value(s) representative of the ambient light based on digital information captured by the cells of the sub-matrix 18, meaning the image portion captured by the sub-matrix 18. It sends this value to the module 28 of the processor via the low speed serial interface 22 and the imaging and video system 25. Upon receipt of the value representative of the ambient light, the module 28 calculates the command(s) for one (or more) display parameter(s) of the screen 8.

In a step 42, the IM-MW module 28 passes these commands to the imaging framework module 30 such that it configures the above mentioned parameter(s). As has been already mentioned, this can concern not only the power to a backlighting device of the screen 8, but also, alternatively or additionally, the brightness (luminance) and/or contrast of the digital images displayed on the screen 8. Thus the user perception of the displayed information is adapted to the ambient light, as a function of the parameter commands which were calculated in step 41. User comfort is therefore improved, while managing the power consumption related to the display by applying a principle of parsimony.

In a step 43, a counter is then initialized which increments a value corresponding to the timer T2. The maximum value of this counter, which determines the value of the timer, corresponds in practice to the interval of time between two updates to the screen display parameters. It is unnecessary to perform this update too frequently. A timer of between 1 and several seconds, for example 2 seconds, is a good compromise between the probability of ambient light conditions varying due to movement of the device (change of orientation relative to a light source such as a lamp or a window if the user is inside and depending on whether it is day or night, and/or relative to the sky if the user is outside and it is daylight), and the latency tolerable to the user when adjustment is necessary.

Then, during a step 45, the counter corresponding to the timer T2 is incremented (for example in rhythm with an internal clock of the processor), unless it is determined in a step 44 that it has reached its maximum value. In the latter case, the steps 41, 42, and 43 described above are repeated. This process continues with all the above steps repeated in a loop until the device exits display mode, which corresponds to satisfying a display mode stop criterion.

As will have been understood, the adjustment of the screen display parameters on the basis of information representative of the brightness of the ambient light is made periodically, with a period substantially corresponding to the timer T2, and loops as long as a stop condition is not satisfied.

This stop condition for the display parameters control loop is a function of the activity of the screen 8, and appears in the following description of an embodiment of the management at a more general level of operation of the image capture and display device 2. This description will now refer to the block diagram in FIG. 3.

In a step 31, the imaging middleware module 28 tests whether the display mode is already activated. There are two separate cases when activity is detected at the display screen, keeping in mind that "activity" here means a variation in the images and/or information displayed. In the absence of such activity it is preferable to stop updating the screen display parameters in order to save battery life, or even, after an even longer period of time, to place the screen in sleep mode.

The step 32 corresponds to the detection or non-detection of (new) activity on the screen when the display mode is not already activated. In the case where new activity is detected, the display mode is activated in a step 33, and the control loop for the screen display parameters is initiated (process described above with reference to FIG. 2). Detection of screen activity occurs, in the imaging middleware module 28, when it is determined that the displayed information must be updated.

The step 34 corresponds to the same test for activity (new or not?) on the screen, but for the case where the display mode is already activated. If no new activity on the screen is detected, then, in a step 37, a counter is initialized whose variable value corresponds to the timer T1. Taking into account the frequency of an internal clock of the processor 10 which sets the rhythm for this counter, its maximum value is such that the timer T1 corresponds to a period on the order of about 1 to 10 seconds. Conversely, when new activity at the screen is detected, then, in a step 35, it is checked whether the count for the timer T1 has already begun (for this purpose the value of the counter can be tested to see whether it is not zero). If yes, then in a step 36, the timer T1 is reset by reinitializing the corresponding counter.

After the step 36, similarly to after the step 37, the counter corresponding to T1 is incremented, in a step 365, and this continues until detection in a step 38 that the counter has reached its maximum value corresponding to the desired period of time.

In this case, in a step 39 an instruction is generated to stop the screen display parameter control loop, which stops the process described above with reference to FIG. 2.

A person skilled in the art will understand that the processes described above with reference to FIGS. 2 and 3 were described very schematically and in a simplified manner. Notably, the steps described correspond to actions or tests which can occur, within the software executed by the processor 10, in a form and/or a sequence which is very different in practice from those described. In particular, these steps can be part of more complex processes, as the purpose of the above presentation was simply to clarify them for the purposes of the present description.

In addition, although the timers T1 and T2 were described as being obtained by incrementing the value of a counter from zero up to a maximum value corresponding to the desired period of time, it is clearly evident that any equivalent implementation is possible, notably decrementing instead of incrementing, or testing for any condition which occurs after a given period of time. Advantageously, the timer T1 can be realized as an adaptation of a timer provided for placing the screen in sleep mode, (also) in order to save battery power.

A few examples of integrating an image capture and display device in a portable electronic device such as a mobile telephone, will now be described with reference to FIGS. 4 and 5. In these figures, only the screen 8 and the photosensitive matrix 12 of the photosensitive cells of the image sensor of the device 2 are represented, in a cross-sectional view of the casing of an electronic device 60. The casing of the device 60 has a first side or main side 61, also called the front, and a second side or rear side 62 opposite the front 61.

Figure 4:
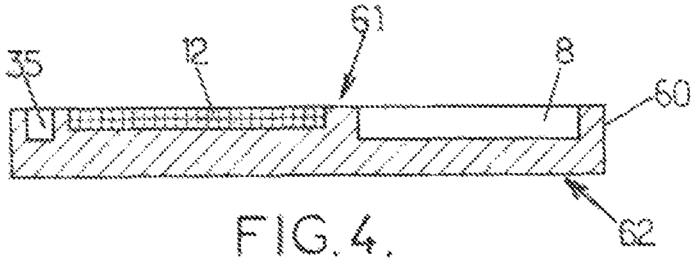
FIG. 4 is a schematic cross-sectional view of a casing of a portable electronic device according to a first embodiment.

In the embodiment in FIG. 4, the screen 8 and the photosensitive matrix 12 of the image sensor or capture unit 4 of the device 2 are arranged on the same main side of the casing, typically the front 61, such that they are facing the same direction. Such a case corresponds for example to that of a third generation mobile telephone having the videotelephony function. This is favorable to the implementation of the invention because the intensity of the incident light on the photosensitive matrix 12 is directly representative of the brightness of the ambient light illuminating the screen 8.

Figure 5:
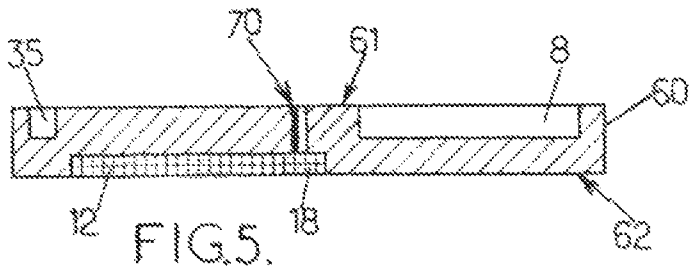
FIG. 5 is a schematic cross-sectional view of a casing of a portable electronic device according to a second embodiment.

Conversely, in the embodiment in FIG. 5, the screen 8 and the matrix 12 are respectively arranged on two main sides of the casing. Typically the screen 8 is on the front 61 while the photosensitive matrix 12 of the image sensor is on the back. In this configuration, they are facing in opposite directions. Therefore the light intensity which can be measured via the photosensitive cells of the image sensor as presented above is not directly related to the light intensity of the ambient light illuminating the screen 8. Typically, it can be lower when the front of the telephone is facing upwards (e.g. towards the sky) and the back is therefore facing downwards (e.g. towards the ground).

To overcome this disadvantage, software processing to compensate can be implemented in the imaging middleware module 28 or in the imaging framework module 30, to take into account differences between the brightness measured on the back side and the actual brightness on the front side, using a given adjustment rule. The correction can, for example, be made as a function of a predefined table of relations, stored in memory, which provides an estimated value for the brightness on the front as a function of the brightness values measured on the back. This table can come from measurements made during development of the device, under actual conditions in various contexts (inside/outside, night/day, etc.).

In one variation, the casing 60 can house a light guide 70 as represented very schematically in FIG. 5, able to guide part of the incident light from the side 61 on which the screen 8 is placed to the photosensitive cells of the photosensitive matrix 12 of the image sensor which is placed on the other side 62.

Any additional arrangement within the reach of a person skilled in the art can be made in order to implement this solution. Notably, the light guide can be curved (it can for example be a portion of optical fiber) so that the guided light reaches the photosensitive cells from the best possible angle. Alternatively or additionally, the matrix of photosensitive cells can be realized on a flexible substrate in order to contribute to the same result. In another variation, parts acting as mirrors can be used to deflect the light into the guide or between light guide portions, in accordance with the constraints of placement in the casing 60.

As was already stated in the introduction, the invention also concerns a portable electronic device comprising an image capture and display device as defined above. This portable electronic device is typically a device such as a personal digital assistant, an audio player, a video player, a camera, a video camera, an electronic gaming device, etc.

The invention has been described and illustrated in the present detailed description and in the Figures. The invention is not limited to the embodiments presented. Other variations and embodiments can be deduced and implemented by a person skilled in the art upon reading the present description and the attached Figures.

In the claims, the term "comprise" does not exclude other elements or other steps. The indefinite article "a" does not exclude the plural. A single processor or several other units can be used to implement the invention. The various characteristics presented and/or claimed can advantageously be combined. Their presence in the description or in different dependent claims does not exclude this possibility. The reference designations are not to be understood as limiting the scope of the invention.

The invention claimed is:

1. A device comprising:

a display screen adapted to display digital information and/or images in a first mode of operation of the device;

an image sensor having a set of photosensitive cells adapted to capture at least one digital image in a second mode of operation of the device, wherein the image sensor comprises a processing unit configured to process digital image data of the at least one digital image in the second mode of operation before sending it to the control unit via a parallel data interface, and configured to generate the information representative of the brightness of the ambient light in the first mode of operation before sending the information to the control unit via a serial data interface; and, a control unit adapted to control at least one display parameter of the screen in the first mode of operation of the device, wherein the control unit is configured to adjust the display parameter of the screen on the basis of information representative of the brightness of ambient light obtained by at least a subset of the set of photosensitive cells of the image sensor.

2. The device according to claim 1, wherein the display parameter of the screen comprises at least one parameter from among the contrast, the luminance, and the backlight intensity parameters of the screen.

3. The device according to claim 1, additionally comprising an electrical power supply unit configured to power the entire set of photosensitive cells of the image sensor in the second mode of operation in which images are captured, and only power the sub-set of photosensitive cells of the image sensor in the first mode of operation.

4. The device according to claim 1, wherein the number of cells in the subset of photosensitive cells is between a few cells and several thousand cells, while being much lower than the total number of cells in the set of photosensitive cells of the image sensor.

5. The device according to claim 1, wherein the image sensor comprises a buffer configured to store the digital image data in the second mode of operation, and wherein the power to said buffer is cut off in the first mode of operation.

6. The device according to claim 1, wherein the control unit is configured to make adjustments to the display parameter of the screen in the first mode of operation, the adjustments being based on information representative of the brightness of ambient light, in a periodic manner as long as a stop condition is not satisfied.

7. The device of claim 1, wherein the device is comprised in a portable electronic device.

8. The device according to claim 7, wherein the portable display device comprises a casing having a first side and a second side opposite the first side, wherein the display screen and the image sensor are both arranged on said first side of the casing.

9. The device according to claim 7, wherein the portable display device comprises a casing having a first side and a second side opposite the first side, wherein the display screen is arranged on said first side while the image sensor is arranged on said second side of the casing, and wherein the control unit is adapted to compensate for differences between a brightness measured on the second side and the actual brightness on the first side, according to a given adjustment rule.

10. The device according to claim 7, wherein the portable display device comprises a casing having a first side and a second side opposite the first side, wherein the display screen is arranged on said first side while the image sensor is arranged on said second side of the casing, and comprising a light guide adapted to guide light captured on the first side to the photosensitive cells in the subset of the set of photosensitive cells of the image sensor.

11. A system for controlling at least one display parameter of a device comprising a display screen for displaying digital information and/or images in a first mode of operation of the device and an image sensor having a set of photosensitive cells for capturing at least one digital image in a second mode of operation of the device, wherein the image sensor comprises a buffer configured to store the digital image in the second mode of operation, and wherein the power to said buffer is cut off in the first mode of operation, wherein the display parameter is adjusted in response to an output of a control unit on the basis of information representative of the brightness of ambient light obtained from at least a subset of the set of photosensitive cells of the image sensor.

12. The system according to claim 11, wherein the display parameter of the screen comprises at least one parameter among the contrast, the luminance, and the backlight intensity parameters of the screen.

13. The system according to claim 11, wherein the entire set of photosensitive cells of the image sensor is powered in the second mode of operation in which images are captured and only the subset of photosensitive cells of the image sensor are powered in the first mode of operation.

14. The system according to claim 11, wherein the number of cells of the subset of photosensitive cells is between a few cells and several thousand cells, while being much lower than the total number of cells in the set of photosensitive cells of the image sensor.

15. The system according to claim 11, wherein the at least one digital image obtained in the second mode of operation is sent to the control unit via a parallel data interface, while the information representative of the brightness of the ambient light, generated in the image sensor in the first mode of operation, is sent to the control unit via a serial data interface.

16. The system according to claim 11, wherein the display parameter adjustment is made in the first mode of operation, on the basis of information representative of the brightness of the ambient light, in a periodic manner and looping as long as a stop condition is not satisfied.

17. A device comprising:

a display screen adapted to display digital information and/or images in a first mode of operation of the device;

an image sensor having a set of photosensitive cells adapted to capture at least one digital image in a second mode of operation of the device, wherein the image sensor comprises a buffer configured to store the at least one digital image in the second mode of operation, and wherein the power to said buffer is cut off in the first mode of operation; and, a control unit adapted to control at least one display parameter of the screen in the first mode of operation of the device, wherein the control unit is configured to adjust the display parameter of the screen on the basis of information representative of the brightness of ambient light obtained by at least a subset of the set of photosensitive cells of the image sensor.

18. A system for controlling at least one display parameter of a device comprising a display screen for displaying digital information and/or images in a first mode of operation of the device and an image sensor having a set of photosensitive cells for capturing at least one digital image in a second mode of operation of the device, wherein the digital image obtained in the second mode of operation is sent to the control unit via a parallel data interface, while the information representative of the brightness of the ambient light, generated in the image sensor in the first mode of operation, is sent to the control unit via a serial data interface, and wherein the display parameter is adjusted in response to an output of a control unit on the basis of information representative of the brightness of ambient light obtained from at least a subset of the set of photosensitive cells of the image sensor.

* * * * *